United States Patent [19]
Kung

[11] Patent Number: 4,577,122
[45] Date of Patent: Mar. 18, 1986

[54] METHOD AND APPARATUS FOR GENERATION OF COHERENT VUV AND XUV RADIATION

[75] Inventor: Andrew H. Kung, Moraga, Calif.

[73] Assignee: The Regents of the University of California, Berkeley, Calif.

[21] Appl. No.: 566,275

[22] Filed: Dec. 28, 1983

[51] Int. Cl.$^4$ .............................................. H03F 7/00
[52] U.S. Cl. ...................................... 307/425; 372/22
[58] Field of Search .................... 307/425; 372/55, 58, 372/700, 701, 21, 22

[56] References Cited

U.S. PATENT DOCUMENTS 3,457,417  7/1969  Buchsbaum et al. .................. 372/22

Primary Examiner—William L. Sikes
Assistant Examiner—Robert E. Wise
Attorney, Agent, or Firm—Fitch, Even, Tabin & Flannery

[57] ABSTRACT

A pulsed free expansion jet of gas interacts with a high energy laser beam pulse to develop higher order odd harmonics of the laser beam. The pulsed jet of gas is introduced into a vacuum chamber so that the gas expands at a supersonic rate. As the pulsed jet of gas enters the vacuum chamber, it interacts with the laser beam pulse which induces a polarization in the gas particles. The induced polarization causes the odd order harmonics of the laser beam to be developed, extending the wavelengths of the laser beam to the VUV and XUV spectral regions.

18 Claims, 3 Drawing Figures

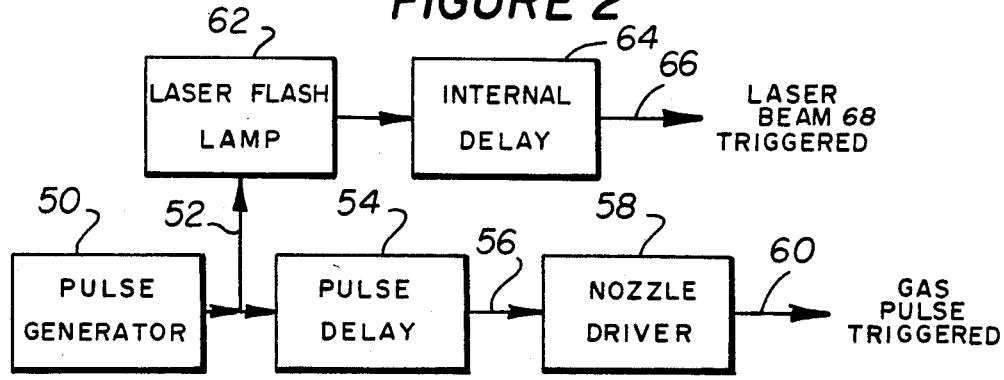
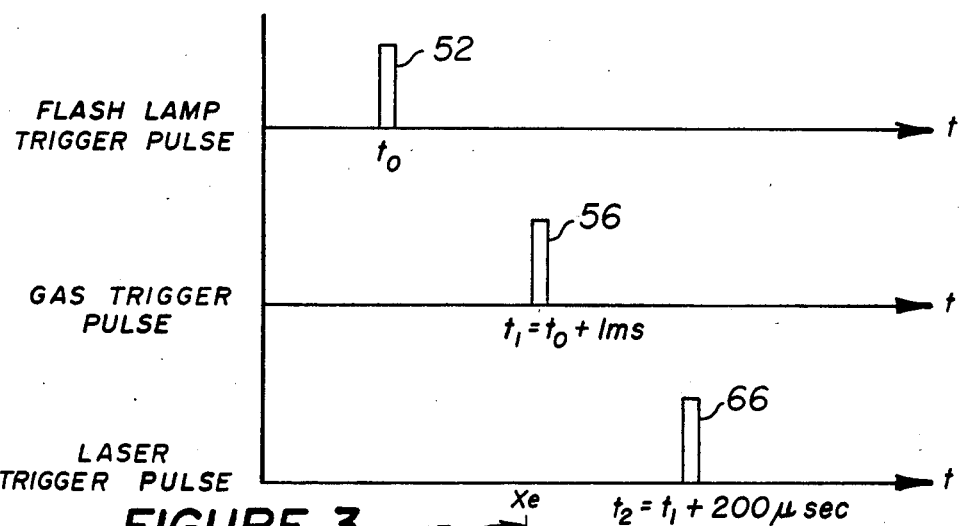
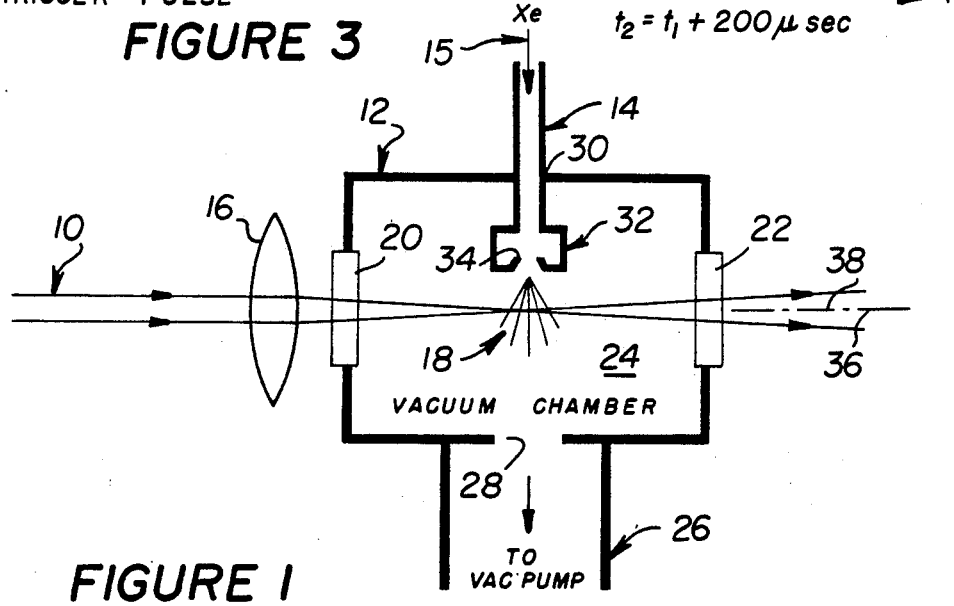

METHOD AND APPARATUS FOR GENERATION OF COHERENT VUV AND XUV RADIATION

The present invention relates generally to non-linear optical generation in gases or metallic vapors and more particularly to a method and apparatus for frequency up-converting a first beam of radiation having a selected first frequency in the visible optical spectrum to develop a second beam of radiation having a selected second frequency in the VUV and XUV spectrums.

In the chemical arts, the laser has been found to be particularly useful in experiments which have extended the knowledge in fields such as molecular spectroscopy, photochemistry and state-selective reaction dynamics. Typically, the lasers utilized in these studies are monochromatic, tunable and high-powered. The wavelengths of these lasers are usually in the spectrum between near infrared wavelengths and ultraviolet wavelengths. However, many important molecular species, such as hydrogen gas ($H_2$), water ($H_2O$), nitrogen gas ($N_2$) and carbon monoxide (CO), have their lowest electronically excited states in the wavelength spectrum known in the art as the vacuum ultraviolet (VUV) band. The vacuum ultraviolet band includes those wavelengths which are below approximately 185 nm. Thus, in order to apply laser techniques to the study of spectroscopy and photochemistry of such species, and further to access the Rydberg states of most molecules, it is necessary to use a tunable laser source which develops a laser having a wavelength within the VUV spectrum.

In the prior art, the availability of lasers operating in the VUV spectrum is limited. For example, laser generation in the VUV spectrum is known to be possible only for a handful of species, most notably hydrogen ($H_2$), fluorine ($F_2$), and carbon monoxide (CO), and the excimers of xenon (Xe), krypton (Kr), and argon (Ar). A significant limitation and disadvantage of lasers discovered in connection with the interaction of these species is that the laser develops only discreet wavelengths and is consequently of limited value in chemical studies as hereinabove described.

To overcome this limitation, techniques have been developed in the prior art which frequency up-convert a high-powered dye laser into the VUV frequency and wavelength spectrum. To frequency up-convert a high-powered dye laser, frequency mixing and harmonic generation techniques which are known in the art are used. For example, non-centrosymmetric crystals are employed as a non-linear up-converting medium which interacts with the high power laser to generate higher-order harmonics of the laser frequency. However, a significant disadvantage and limitation of such crystals is that most known crystals become optically opaque for radiation with a wavelength less than about 195 nm. and therefore are not suitable for generating VUV radiation.

To overcome this limitation in the prior art, there have been developed techniques wherein the non-linear medium is either one of the rare gases or a suitable metal vapor. Using these prior art techniques, the generation of coherent light throughout the VUV spectrum is known. Furthermore, these techniques also allow the generation of coherent light which is in the extreme vacuum ultraviolet band (XUV), that is, light whose wavelengths is below 104 nm.

Most of the prior art devices which use rare gases or metal vapors as the non-linear medium provide a cell to contain the gas or vapor. To radiate the laser energy into the cell, a window which is translucent to the wavelength of the incoming light must be used. Also, a suitable beam exit window must also be present which is translucent to the smaller wavelength of the exiting light which is developed as a result of the interaction in the cell between the incoming beam and the high pressure gas. For example, lithium fluoride (LiF) is often chosen since it is translucent to light with a wavelength greater than 104 nm. A significant disadvantage and limitation of the prior art gas cells is that the available window materials are limited in their spectral coverage, thus introducing significant losses and attenuation into the system as wavelengths become smaller.

The technique of differential pumping has been developed in the prior art for those situations where available window materials are not suitable. Differential pumping contains the gas in a cell which has only one window through which the long wavelength incoming laser light is transmitted. The opposite wall of the gas cell has a pinhole orifice which is dimensioned to control the flow rate of gas escaping therefrom and also to allow the laser beam to pass therethrough. The laser beam and the freely expanding gas interact at the pinhole orifice to develop coherent radiation which is an odd number higher harmonic of the incoming laser beam.

A limitation and disadvantage of the differential pumping technique is that, although wavelengths shorter than 104 nm are possible, the gas flow through the orifice is continuous and in the direction of the laser beam. This creates unnecessary absorption and turbulence to the propogation of the beam. The continuous gas flow often leads to requirements of multiple stages of differential pumping in order to avoid self-absorption of the generated radiation and to achieve desirably low working pressure in the vacuum chamber.

It is therefore an important object for the present invention to provide a novel apparatus and method for frequency up-converting a first beam of radiation into a second coherent beam of radiation.

Another important object of the present invention is to interact a pulsed jet of freely expanding gas with a pulse of radiation to effect such frequency up-conversion.

Another object of the present invention is to provide a high density of gas only at the focused region of the first beam, the interacting region, and only at the time when such beam is present at the focus.

Another object of the present invention is to cool the pulsed jet of gas by supersonic expansion of the gas particles.

These and other objects, advantages and features of the present invention will become more apparent from a study of the following description when read in conjunction with the accompanying drawings, wherein:

FIG. 1 schematically illustrates a pulsed jet frequency up-converter according to the principles of the present invention;

FIG. 2 is a schematic block diagram illustrating the operation of the apparatus of FIG. 1;

FIG. 3 is a timing diagram associated with FIG. 2.

Broadly stated, the present invention is directed to a method and apparatus for frequency up-converting a first beam of radiation having a selected first frequency to develop a second beam of radiation having a selected second frequency higher than the first frequency. A high pressure gas is pulse modulated to develop a plurality of successive pulsed jets of freely expanding gas. The first beam of radiation is also pulse modulated to develop a plurality of beam pulses. Each successive pulsed jet of gas is then interacted with a corresponding one of the beam pulses. The pulsed jet of gas freely expands when interacting with the high power beam pulse so that the second beam of radiation is developed. The known non-linear techniques for such generation of radiation are generally known in the art as harmonic generation, four-wave mixing, Raman scattering, and Anti-Stokes generation.

According to the present invention, when the pulsed jet of gas is injected into a relatively low pressure chamber with respect to the pressure of the gas, it provides a high gas density only at the interacting region, the region in the vicinity of the gas injection point where the beam pulse is focused. This localized high gas density, together with the cooling of the gas by the supersonic expansion of the gas particles, provides key advantages over the prior art. For example, the high gas density obtainable from a pulsed jet, the well defined geometry of the beam pulse, and the supersonic cooling of the pulsed jet of gas provide higher conversion efficiencies than known gas cells or other means of confining the gaseous medium for the generation of the coherent optical radiation.

The apparatus and method of the present invention is especially useful for generation of coherent radiation in the spectral region where no suitable beam exit window material is available. No exit window is required for the purpose of confining the high density gas used for the interaction, according to the present invention, since the gas density only needs to be high in the beam interacting region, and this region is localized in the manner as described above. Other uses of the present invention are for the efficient generation of radiation in the X-ray, infrared (ir) and the far-ir spectral regions. As in known non-linear optical generation processes, the radiation generated by the process of the present invention is spacially coherent and polarized.

Referring now to FIG. 1, there is schematically shown an apparatus useful for practicing the present invention. FIG. 1 shows a first beam of radiation 10, a vacuum chamber 12, and means 14 for developing a plurality of successive pulsed jets of gas from a source 15 of high pressure gas.

The incoming beam 10 of radiation of one or more wavelengths is pulse modulated to develop a plurality of successive beam pulses. Each successive beam pulse of beam 10 is incident upon a lens 16 which focuses beam 10 at a focal point 18. Note that beam 10 may be composed of a plurality of beams, each of a different selected wavelength, rather than a single wavlength beam from a single laser. Such a multi-wavelength beam may provide higher efficiency up-conversion of beam 10 into a higher frequency beam.

Vacuum chamber 12 includes a first window 20 which allows beam 10 to propagate between lens 16 interiorly of vacuum chamber 12 to focal point 18, a second window 22, an example of an exit means, and an interior chamber 24. Note that exit means 22 could also be a grating monochrometer, other means of dispersing beams 36 and 38, such as a prism or a selectively reflective mirror, or any combination of these. What is required of this exit means is that it enables interior chamber 24 to be maintained at a pressure substantially lower than the pressure of the gas provided by the source of high pressure gas. The pressure of interior chamber 24 is maintained by a vacuum pump means 26 which communicates with interior chamber 24 through an opening 28 in vacuum chamber 12.

Gas jet pulse developing means 14, which is disposed through an opening 30 of vacuum chamber 12, includes valve means 32 for selectively communicating the source of high pressure gas with interior chamber 24. Valve means 32 includes an orifice 34 having a selected diameter and means for periodically allowing the high pressure gas to pass through the orifice 34 to inject the successive pulsed jets of gas into chamber 24. For example, valve means 14 may be sealed by a piezo-electrically driven plunger (not shown) which is opened synchronously with the triggering of each beam pulse to develop each freely expanding pulsed jet. The piezoelectrically driven plunger is commercially available from Laser Technics under model designation LPV. As previously described, the pulsed jet or gas expands at a supersonic rate, causing the gas to cool which maximizes the bandwidth quality of the resultant frequency up-converted beam. Use of a pulsed jet is also advantageous because it reduces self-absorbtion and vacuum pumping requirements.

In a preferred embodiment of the present invention, focal point 18 is at a selected distance from orifice 34 of valve means 32, the distance being about one to three times the diameter of orifice 34. Furthermore, focal point 18 is arranged along the path of the pulsed jet of gas exiting orifice 34 of valve means 32.

As the pulsed jet of gas enters the interior vacuum chamber 24, it interacts with beam 10, which induces a polarization in the gas particles. This induced polarization causes odd order harmonics of beam 10 to be developed. Interaction of the pulsed jet of gas and the beam pulse at focal point 18 causes two collinear exiting beams 36 and 38 to be developed and pass through the second window 22 exit means. The first exiting beam 36 is of the same frequency as the first beam 10. The second exiting beam 38 is frequency up-converted due to the interaction of the gas pulse and beam pulse. This interaction is well known in the art of non-linear optical frequency conversion techniques, as hereinabove described.

Referring now to FIGS. 2 and 3, there is shown a schematic block diagram (FIG. 2) and timing diagram (FIGS. 3) to illustrate one complete cycle of the process performed by the apparatus as described in conjunction with FIG. 1. More specifically, a pulse generator 50 periodically fires a pulse 52 at time $t_0$. Each pulse 52 is applied to a pulse delay means 54 for delaying pulse 52 so that a delayed pulse 56 is developed at time $t_1$. The delayed pulse 56 is applied to a nozzle driver 58 which drives the piezo-electric plunger in valve means 32. At 60, it is indicated that when the delayed pulse 56 is applied to nozzle driver 58, the pulsed jet of gas is triggered.

Pulse 52 is also applied to a laser flash lamp power supply 62 to initiate the generation of first beam 10. Laser flash lamp power supply 62 feeds an internal delay means 64 for developing a pulse 66 at a time $t_2$ as illustrated in FIG. 3. At time $t_2$, the second delayed pulse 66 triggers one laser beam pulse 68.

Referring also to FIG. 1, first beam 10 in one embodiment of the present invention may be developed from a Nd:YAG laser which has a 3547 Angstrom wavelength. Lens 16 is a fused quartz lens having a 20 centimeter focal length at a beam diameter of 30 micrometers. The focal point 18 is positioned at the center of vacuum chamber 12 which may be 35 centimeters long. The output window 22 is a lithium fluoride window, whereas input window 20 is a fused quartz window. The apparatus of the present invention is useful for generating the odd number harmonics from the first beam 10, and, with one embodiment of the present invention, the output beam 38 has a wavelength of 1182 Angstroms. Of course, other odd harmonics of first beam 10 are developed; however, when output window 22 is constructed from LiF, the fifth and higher order harmonics are not passed therethrough. Output window 22 need not be present and may be omitted so that radiation in the XUV band may also be developed and utilized.

The pressure of the high pressure gas is preferably on the order of several atmospheres whereas interior chamber 24 is maintained at a pressure no greater than $10^{-3}$ Torr. These pressures are selected so that each pulsed jet of gas dissipates in interior chamber 24 at a supersonic rate. The time delays provided by pulse delay means 54 and internal delay means 64 are selected in accordance with the dimensions for the focal length of lens 20, the distance which focal point 18 is spaced from orifice 34, the length of vacuum chamber 12, and the mechanical response rate of valve means 32. For example in the embodiment of the present invention hereinabove described, the time delay of delay means 54 ($t_1 - t_0$) is 1 ms and the time delay of internal delay means 64 is selected so that $t_2 - t_1$ is 200 microseconds.

There has been described novel apparatus and techniques for harmonic generation of the coherent beam of radiation from a source beam of radiation having a lower frequency. It should be obvious to those skilled in the art that numerous uses of and modifications to the present invention may be made without departing from the inventive concepts disclosed herein. Accordingly, the present invention is to be limited solely by the scope of the following claims.

What is claimed is:

1. A method for frequency up-converting a first beam of radiation having a selected first frequency to develop a second beam of radiation having a selected second frequency higher than said first frequency, said method comprising:
   developing a plurality of successive pulsed jets of gas from a source of high pressure gas;
   pulse modulating said first beam of radiation; and
   interacting each successive pulsed jet with a corresponding beam pulse to develop said second beam.

2. A method as set forth in claim 1 wherein said developing step includes injecting each said gas pulse into a chamber having a pressure substantially lower than the pressure of each said gas source.

3. A method as set forth in claim 2 wherein said injection step includes selecting the relationship between the pressure of said chamber and the pressure of said source of gas to cause each said pulsed jet of gas to dissipate at a supersonic rate.

4. A method as set forth in claim 1 wherein said interacting step includes:
   focusing each said beam pulse to converge at a focal point; and
   arranging said focal point to be spatially within each successive pulsed jet of gas.

5. A method as set forth in claim 4 wherein said interacting step further includes propagating each said beam pulse in a direction orthogonal to the direction of propagation of the corresponding pulsed jet of gas.

6. An apparatus for frequency up-converting a first beam of radiation having a selected first frequency to develop a second beam of radiation having a selected second frequency higher than said first frequency, said apparatus comprising:
   means for developing a plurality of successive pulsed jets of gas from a source of high pressure gas;
   means for pulse modulating said first beam to develop a plurality of successive beam pulses, each of said beam pulses being associated with a respective one of said pulsed jets; and
   means for interacting each of said beam pulses with the associated one of said pulsed jets to develop said second beam.

7. An apparatus as set forth in claim 6 wherein said developing means includes:
   a chamber having a pressure substantially lower than the pressure of said gas source; and
   means for injecting each of said pulsed jets into said chamber.

8. An apparatus as set forth in claim 7 wherein the relationship between the pressure of said chamber and the pressure of said gas source is selected to cause each said pulsed jet to dissipate at a supersonic rate.

9. An apparatus as set forth in claim 6 wherein said interacting means includes:
   means for focusing each of said beam pulses to converge at a focal point; and
   means for arranging said focal point to be spatially within each of said successive pulsed jets.

10. An apparatus as set forth in claim 9 wherein said interacting means further includes means for propagating each of said beam pulses in a direction orthogonal to the direction of propagation of the associated one of said pulsed jets.

11. An apparatus for frequency up-converting a first beam of radiation having a selected first frequency to develop a second beam of radiation having a selected second frequency higher than said first frequency, said apparatus comprising:
    a source of high pressure gas;
    a gas cell having an interior chamber and a window;
    valve means for selectively communicating said source with said chamber;
    means for evacuating said chamber; and
    means for focusing said first beam to a focal point within said chamber, said beam propagating through said window into said chamber, said focal point being disposed within said chamber so that said beam interacts with said gas when said source is communicating with said chamber to develop said second beam.

12. An apparatus as set forth in claim 11 wherein said valve means includes:
    an orifice having a selected diameter; and
    means for periodically allowing said gas to pass through said orifice to inject a plurality of successive pulsed jets of gas into said chamber.

13. An apparatus as set forth in claim 12 wherein said apparatus further includes:
    means for pulse modulating said first beam to develop a plurality of successive beam pulses; and
    means for synchronizing said beam pulses with said pulsed jets so that each of said beam pulses interacts with a respective one of each of said pulsed jets at said focal point.

14. An apparatus as set forth in claim 13 wherein said focal point is disposed at a selected distance from said orifice.

15. An apparatus as set forth in claim 14 wherein said selected distance is between one and three times said selected diameter of said orifice.

16. An apparatus for frequency up-converting a first beam of radiation having a selected first frequency to develop a second beam of radiation having a selected second frequency higher than said first frequency, said apparatus comprising:
- a source of high pressure gas;
- means for developing a periodic pulse;
- means for delaying said periodic pulse for a first selected time;
- valve means responsive to said delayed pulse for triggering a pulsed jet of high pressure gas; and
- flash lamp means responsive to said periodic pulse for initiating the development of said first beam, and for triggering a pulse of said first beam at a second selected time after the triggering of said pulsed jet, such that said first beam interacts with said pulsed jet of high pressure gas to develop said second beam.

17. An apparatus as set forth in claim 16 wherein said first selected time is one millisecond.

18. An apparatus as set forth in claim 17 wherein said second selected time is 200 microseconds.

* * * * *